(12) United States Patent
Bellows et al.

(10) Patent No.: US 11,521,003 B1
(45) Date of Patent: Dec. 6, 2022

(54) LAYOUT GENERATION FOR LOCATION-TRACKING SENSORS

(71) Applicant: ZEBRA TECHNOLOGIES CORPORATION, Lincolnshire, IL (US)

(72) Inventors: David Bellows, Old Westbury, NY (US); Aslam Mohammed, Glen Ellyn, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/355,652

(22) Filed: Jun. 23, 2021

(51) Int. Cl.
*G06K 7/10* (2006.01)
*G06Q 10/08* (2012.01)

(52) U.S. Cl.
CPC ....... *G06K 7/10475* (2013.01); *G06Q 10/087* (2013.01)

(58) Field of Classification Search
CPC .................................................. G06K 7/10475
USPC ......................................................... 235/451
See application file for complete search history.

(56) References Cited

U.S. PATENT DOCUMENTS

| | | | |
|---|---|---|---|
| 11,257,030 B1* | 2/2022 | Kantor | G06Q 10/087 |
| 11,270,240 B2* | 3/2022 | Mulay | G06Q 10/087 |
| 2013/0300729 A1* | 11/2013 | Grimaud | G06T 7/001 |
| | | | 345/419 |
| 2014/0304123 A1* | 10/2014 | Schwartz | G06Q 10/087 |
| | | | 705/28 |
| 2017/0286773 A1* | 10/2017 | Skaff | G06V 10/751 |
| 2018/0247255 A1* | 8/2018 | Jones | G06T 7/90 |
| 2019/0147228 A1* | 5/2019 | Chaudhuri | G06Q 30/0201 |
| | | | 382/118 |
| 2020/0342519 A1* | 10/2020 | Belt | G06K 19/0723 |

* cited by examiner

*Primary Examiner* — Allyson N Trail

(57) ABSTRACT

Layout generation for location-tracking sensors is disclosed herein. An example method in a computing device includes: receiving a map defining a set of features of a facility; obtaining layout data corresponding to the facility, the layout data defining, for each of a plurality of location tracking sensors, a location in a facility coordinate system; in response to deployment of the location tracking sensors in the facility according to the layout data, obtaining a performance metric for each of the location tracking sensors; and updating a primary layout generator according to the map, the layout data, and the performance metrics.

18 Claims, 8 Drawing Sheets

LAYOUT GENERATION FOR LOCATION-TRACKING SENSORS

BACKGROUND

Various facilities, such as retail facilities containing various items for purchase, transport and logistics facilities such as warehouses storing items for shipment, and the like, may deploy inventory tracking systems. Such systems may, for example, track the locations of items to which radio frequency identification (RFID) tags are affixed. To implement location tracking, location sensors such as RFID readers may be installed throughout the facility. Data captured by the RFID readers (e.g. tag responses to scans emitted by the readers) can be employed to determine locations for the RFID-tagged items. However, determining where to place location sensors throughout a facility, e.g. in order to achieve adequate coverage of the facility, may be a time-consuming task performed by expert staff.

SUMMARY

In an embodiment, the present invention is a method in a computing device including: receiving a map defining a set of features of a facility; obtaining layout data corresponding to the facility, the layout data defining, for each of a plurality of location tracking sensors, a location in a facility coordinate system; in response to deployment of the location tracking sensors in the facility according to the layout data, obtaining a performance metric for each of the location tracking sensors; and updating a primary layout generator according to the map, the layout data, and the performance metrics.

In another embodiment, the present invention is a computing device including: a communications interface; a memory; and a processor configured to: receive a map defining a set of features of a facility; obtain layout data corresponding to the facility, the layout data defining, for each of a plurality of location tracking sensors, a location in a facility coordinate system; in response to deployment of the location tracking sensors in the facility according to the layout data, obtain a performance metric for each of the location tracking sensors; and update a primary layout generator according to the map, the layout data, and the performance metrics.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
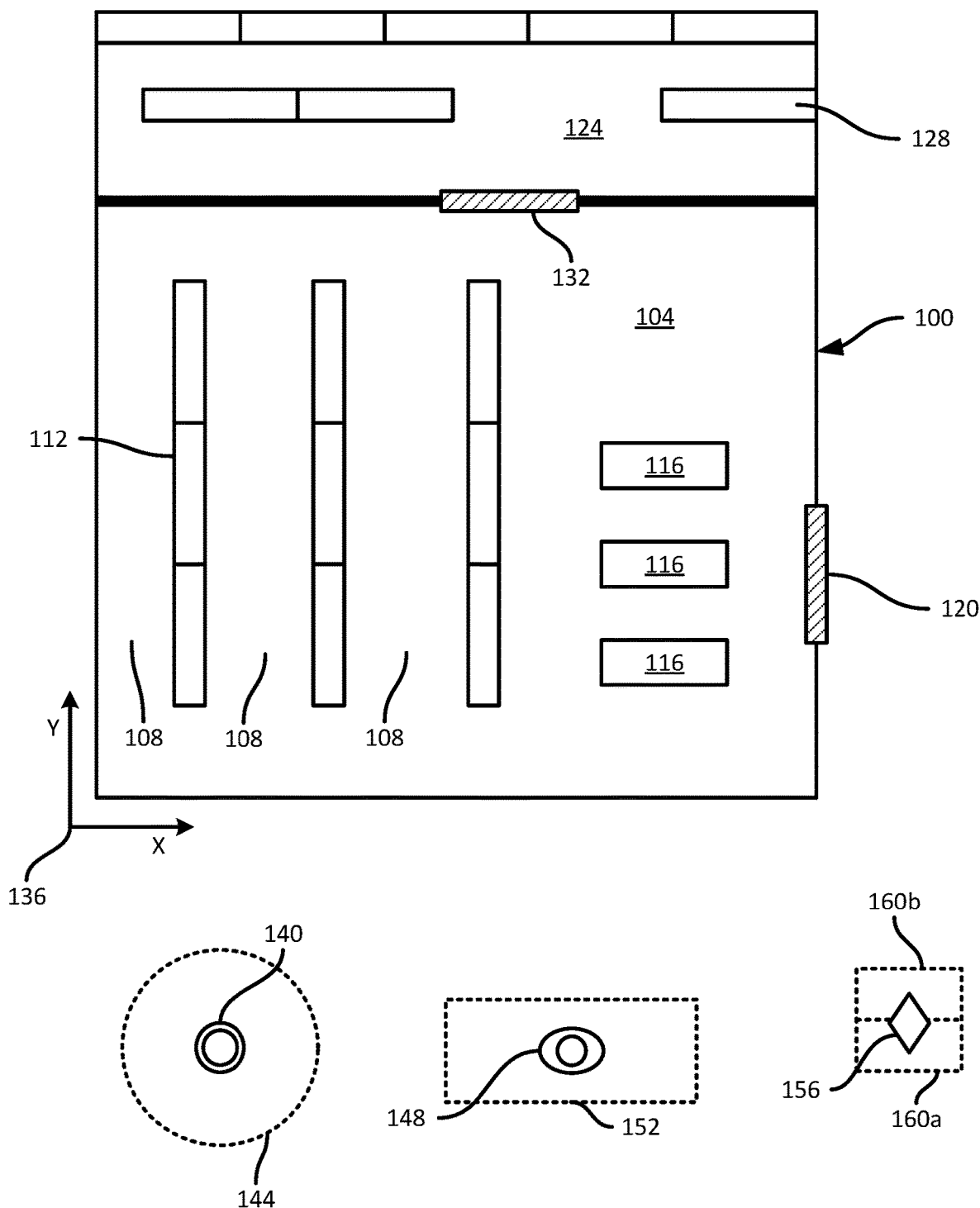
FIG. 1 illustrates a schematic diagram of a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Items within a facility, such as a retail facility, warehouse, or the like, can be tracked by installing location sensors such as RFID readers throughout the facility, and affixing or otherwise associating tokens detectable by such sensors (e.g. RFID tags) to the items to be tracked. As will be apparent to those skilled in the art, the location sensors can be operated to periodically scan for tags. The tag responses detected by each sensor, which may contain a tag identifier, such as an electronic product code (EPC), and a signal strength, can be collected and used by a location tracking controller to determine locations of each tag, and therefore of each tagged item.

Determination of locations of the tagged items depends on accurate knowledge of the positions and/or orientations of the sensors themselves within the facility. Further, the performance of any given location sensor can be adversely affected by its proximity to physical features of the facility, such as walls, columns, ductwork, support structures such as shelves, and the like. Such features may reflect or absorb the RF energy transmitted from and received by the location sensors, thereby affecting how well the sensors can track the items. The performance of the system as a whole can also be affected by the relative positions of sensors to each other. For example, tags in certain regions of a facility may be insufficiently detected if the sensors in that region are separated by large distances (although each individual sensor may be performing as expected). Further, the performance of the location tracking system may be influenced by the type of item(s) being tracked. This may result in a location tracking system, or portions thereof, used to track items of one type needing to be laid out differently than a location tracking system, or other portions thereof, used to track items of another type.

The selection of a sensor layout for the facility—that is, the location and/or orientation of each sensor in the facility, as well as which type of sensor is to be deployed at the relevant location, when multiple types of sensors are in use—therefore determines the effectiveness of the location tracking system. Sensor layouts can be prepared by expert staff (e.g. referred to as map makers or layout makers) prior to deployment (i.e. physical installation of the sensors at the facility). The availability of such experts may be limited, however, and designing and deploying location tracking systems for new facilities may therefore be delayed, particularly as the number of such facilities increases (e.g. in the case of a retailer operating hundreds or thousands of facilities across a country or other region). In addition, sensor layouts may be altered after installation, e.g. to resolve a performance issue or otherwise optimize the performance of the location tracking system. Such adjustments may not reach the experts, with the result that similar suboptimal sensor locations may be selected by the experts for future facilities, resulting in similar adjustments being made after installation.

Described herein are systems and methods for implementing at least a partially automated sensor layout generation, as well as the collection of sensor performance data and use of such performance data to improve the automated sensor layout generation processes.

FIG. 1 illustrates a facility 100 depicted from overhead, in which a location tracking system is to be deployed. The facility 100 can be, for example, a retail facility containing items disposed on racks, aisles of shelving, or other suitable support structures. For example, the facility 100 as shown in FIG. 1 includes a customer area 104 containing a plurality of aisles 108 defined by support structures 112, such as shelf modules. The support structures 112 can also include peg boards, clothes racks, and the like, in other examples. The aisles 108 support a variety of items for purchase by customers of the facility 100. Items may be purchased, for example, at a point of sale (PoS) station 116 (of which the example facility 100 in FIG. 1 includes three) disposed adjacent to a doorway 120 of the facility 100.

The facility 100 also includes, in this example, a storage room 124, e.g. for additional inventory used to replenish the items on the support structures 112. The storage room 124 contains further support structures 128 (which may be of the same type, or different types, than the support structures 112). The storage room 124 is separated from the customer area 104, in this example, by a doorway 132. As will now be apparent to those skilled in the art, a wide variety of other areas can be included in the facility 100. For example, the customer area 104 can be subdivided into regions devoted to distinct types of items (e.g. a region containing support structures 112 for apparel, and another region containing support structures 112 for grocery items).

At least some items in the facility 100 are associated with location tags, such as RFID tags. A location tracking system, once deployed in the facility 100, can be configured to periodically detect and locate each of the above-mentioned RFID tags, thus locating the items associated therewith. Locations can be defined, for example, according to a predefined facility coordinate system 136. Although the coordinate system 136 is illustrated with two axes in the overhead view of FIG. 1, the coordinate system 136 can be a three-dimensional system, e.g. with a Z axis that is orthogonal to both the X and Y axes. As will be apparent from FIG. 1, the facility 100 does not contain a location tracking system. In order to provide location tracking functionality within the facility 100, location sensors such as RFID readers must be deployed in the facility, and connected with an associated controller configured to collect tag data from the RFID readers and determine tag locations therefrom.

The location sensors deployed within the facility 100 to implement a location tracking system can include any suitable number of sensors, chosen from distinct sensor types in some examples. FIG. 1 illustrates three example sensor types: a ceiling-mounted location sensor 140 with a substantially broad circular coverage area 144, e.g. suitable for deployment in the customer area 104; a ceiling-mounted location sensor 148 with a substantially rectangular coverage area 152, e.g. suitable for deployment in the storage room 124; and a transitional location sensor 156 disposed at a doorway between the customer area 104 and the storage room 124, and/or between the customer area 104 and the exterior of the facility 100. The transitional sensor 156 may have two distinct coverage areas 160a and 160b, for placement with one on each side of the doorway, so as to detect when a tag transitions between one side and the other side of the doorway, in either direction. Various other types of sensors can also be selected for deployment in the facility 100, including, for example, point of sale sensors configured to read tags in a restricted coverage area (e.g. compared to the sensors 140, 148, and 156) corresponding to a PoS station 116 at which the PoS sensor is disposed.

Deploying a location tracking system containing various combinations of one or more of the above sensors involves generation of a sensor layout, which defines locations and/or orientations (in the coordinate system 136) and sensor types for a plurality of sensors to be installed in the facility 100. As will be discussed below, performance data for some layouts (whether generated automatically or manually) can be collected and employed to refine the automated or semi-automated generation of further layouts.

Figure 2:
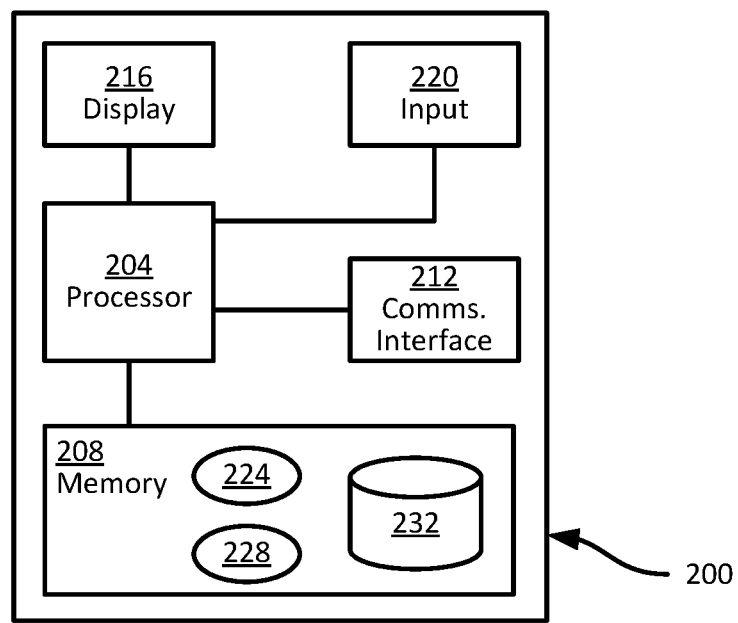
FIG. 2 illustrates a schematic diagram of certain components of a computing device.

Turning to FIG. 2, certain components of a computing device 200 are illustrated. The computing device 200 is configured, as discussed below, to automatically or semi-automatically generate sensor layouts, and to collect and process performance data from installed layouts to support automatic generation of future layouts (e.g. in additional facilities).

The computing device 200 includes a controller, such as a processor 204, interconnected with a non-transitory computer readable storage medium, such as a memory 208. The memory 208 includes a combination of volatile memory (e.g. Random Access Memory or RAM) and non-volatile memory (e.g. read only memory or ROM, Electrically Erasable Programmable Read Only Memory or EEPROM, flash memory). The processor 204 and the memory 208 each comprise one or more integrated circuits. The computing device 200 also includes a communications interface 212 enabling the computing device 200 to exchange data with other devices, including the location sensors of a location tracking system deployed in the facility 100, e.g. via a network. As will be apparent, a location tracking system may also include an on-site controller connected to the location sensors. Such a controller can be configured to collect tag reads from the sensors in the system, and to process the tag reads to determine tag locations within the facility 100. The computing device 200 can therefore communicate with such a controller rather than directly with the sensors, in some examples.

The computing device 200 also includes one or more output devices, such as a display 216, and one or more input devices 220 (e.g. a keyboard and mouse, or the like). The input and output devices can be connected locally to the processor 204, or remotely, via another computing device and the communications interface 212.

The memory 208 stores computer readable instructions for execution by the processor 204. In the illustrated example, the memory 208 stores a layout generation application 224 (also referred to as a layout generator 224) executable by the processor 204 to automatically generate at least partial sensor layouts for facilities. The layout generator 224 can implement a suitable machine learning mechanism, or combination thereof (e.g. neural networks or the like). The memory 208 also stores a control application 228. The control application 228 is executable by the processor 204 to present the layout data generated by the application 224 (e.g. in a user interface presented on the display 216), and to receive modifications or additions to the layout data generated by the application 224, both before and after installation of the corresponding location tracking system. Further, the control application 228 configures the processor 204 to collect performance data for installed location tracking systems, e.g. for storage in a repository 232, and to process the performance data for use in updating the configuration of the application 224. In other words, the control application 228 uses the above-mentioned performance data to re-train the model(s) implemented by the layout generator 224. Such re-training enables the application 224 to generate layout data for further location tracking system deployments that reflects adjustments made to optimize or otherwise adjust previous location tracking systems. That is, the collection and processing of performance data to re-train the layout generator 224 may enable the application 224 to generate layout data requiring less or no adjustment before or after installation, and may also enable the application 224 to automatically generate layout data for greater portions of future location tracking systems.

Figure 3:
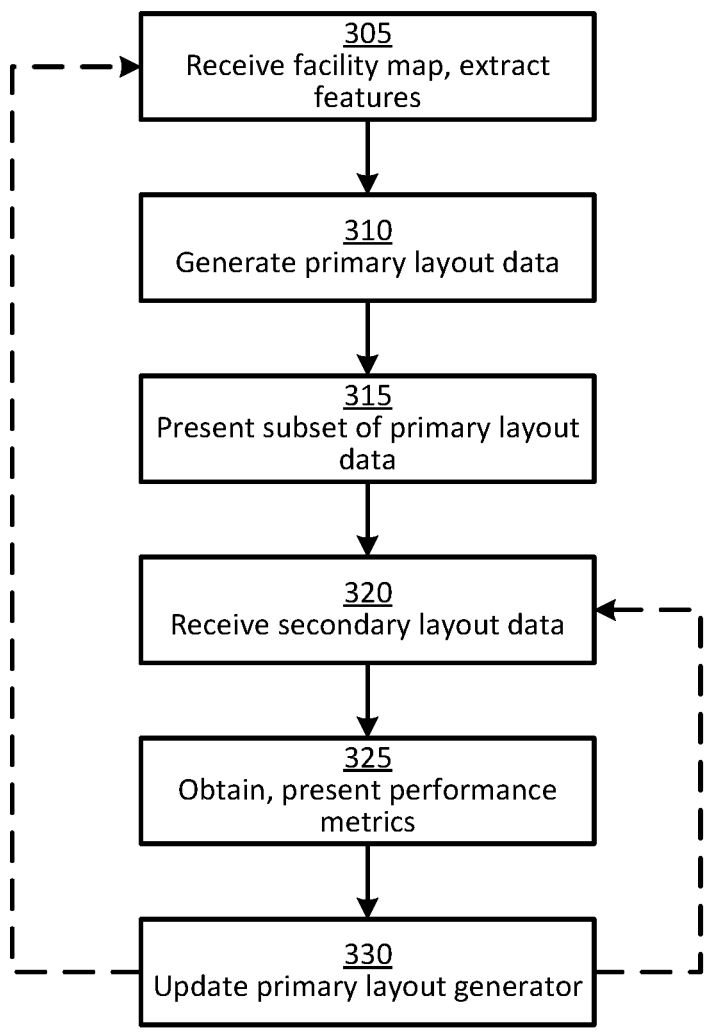
FIG. 3 is a flowchart of a method for generating layout data for a location tracking system.

Turning to FIG. 3, a method 300 of generating layout data for location tracking systems is shown. The method 300 will be described in conjunction with its performance by the computing device 200 as discussed above, via the execution of the applications 224 and 228.

At block 305, the computing device 200 (specifically, the application 228) is configured to receive a map of a facility for which a location tracking system is to be deployed. For example, the computing device 200 can receive a map of the facility 100 as shown in FIG. 1. The map defines, as shown in FIG. 1, the locations and shapes/sizes of the physical features of the facility 100, including walls, doorways, support structures, PoS stations, and the like. The map can also define other features not illustrated in FIG. 1, such as structural components in the facility (for example columns, beams, trusses, girders, and the like), the locations of ceiling-mounted light fixtures, ventilation equipment (for example air handlers and ductwork), plumbing equipment, electrical equipment, network closets, cameras, signage, displays, dressing rooms, speakers, and the like. Each feature can be defined by sets of coordinates in the coordinate system 136, as well as by a feature label or other identifier (e.g. indicating that the feature is a support structure of a particular type, a PoS station, or the like). The labels can be included in the map as metadata, graphical indicators in an image file, or the like. The map may be provided to the computing device 200 in any suitable format (e.g. a tagged image, an extensible markup language (XML) file, or the like). In some embodiments, features may also be defined by photos or videos corresponding to the various areas of the facility 100.

The computing device 200 is also configured, at block 305, to extract the above-mentioned features from the map, for use as inputs to the application 224. The computing device 200 can be configured, for example, to generate feature vectors for each feature, e.g. including values for the coordinates defining the area occupied by the feature, and a value for the feature's type and/or subtype as applicable (e.g. a support structure, and which type of support structure). The computing device 200 can also generate features from the map that are not explicitly indicated therein, such as an area (e.g. in square meters) of the facility 100 as indicated by the map, and/or areas of regions of the facility indicated in the map, such as the customer area 104 and the storage room 124. The features extracted at block 305 can also include facility metadata such as an operating entity of the facility 100, a type of the facility 100 (e.g. retail, apparel, grocery, or the like). In other examples, such types can be associated with specific regions of the facility 100, according to the map.

In further embodiments, the computing device 200 may also be configured to receive the type of RFID-tagged items being tracked in each area of the facility 100, such as apparel, sporting goods, electronics, tires, fashion accessories, or the like and/or details relating to the type of support structure(s) each item type is disposed on, such as metal shelves, wood racks, plastic hangers, open bins, or the like. Further, the computing device 200 may also be configured to receive a value, or a range of values, corresponding to a quantity of RFID-tagged items expected to be tracked in each area of the facility 100. This may alternatively be represented as a tag density value or range when considering the number of expected tagged items over a coverage area. For example, an apparel section of a retail facility may have a higher RFID-tagged item density compared to a grocery area in the facility. Areas with a higher concentration of RFID-tagged items may require a different sensor layout configuration for location tracking compared to areas with a lower concentration of RFID-tagged items.

At blocks 310 to 320, the computing device 200 is configured to obtain layout data for the location tracking system. The layout data is obtained as a combination of primary layout data, which is generated automatically, and secondary layout data, which is received e.g. via the input device 220. Together, the primary and secondary layout data define the layout for the location tracking system. As will be apparent in the discussion below, the respective proportions of the layout data represented by primary layout data and secondary layout data can vary widely. In some examples, the entirety of the layout data may be primary layout data, or secondary layout data.

At block 310, the computing device 200 is configured to generate primary layout data. In particular, the application 228 is configured to provide a set of inputs to the layout generator 224. The inputs include the above-mentioned features extracted from the map of the facility 100, formatted according to the type and construction of the machine learning model(s) employed by the application 224. In response to receiving the inputs, the layout generator 224 is configured to return a set of sensor definitions. Each sensor definition includes a location, e.g. a set of coordinates in the coordinate system 136, and/or an orientation relative to the coordinate system 136. Each sensor definition can also include a sensor type, when the application 224 has been trained on previous layout data including distinct sensor types.

In the present example, the application 224 has not yet been trained, as no performance data from an existing deployment has been collected. Therefore, block 310 can simply be omitted in this performance of the method 300, or the application 224 can return an error message or the like.

At block 315, the computing device 200 is configured to present at least a subset of the primary layout data via the display 216. The presentation of the primary layout data, along with the map of the facility 100, enable an operator of the computing device 200 (such as a map maker mentioned earlier) to verify and/or edit the layout data, e.g. to add additional sensors, and/or remove or relocate sensors from the primary layout data, as discussed below in connection with block 320.

The selection of a subset of primary layout data for display will be discussed in greater detail below. In the present performance of the method 300, given that no primary layout data was produced at block 310, no layout data is presented at block 315. Therefore, the data presented at block 315 includes the map of the facility 100, without any layout data. The interface presented on the display 216 may also include selectable elements for manually placing sensors of various types on the map to generate layout data.

At block 320, the computing device 200 is configured to receive secondary layout data. While primary layout data includes the sensor definitions generated by the application 224, secondary layout data includes modifications to the primary layout data (e.g. relocation of sensor definitions, modification of sensor types in sensor definitions, deletion of sensor definitions from the primary layout data), and/or additional layout data (e.g. new sensor definitions). The secondary layout data may be received via the input device 220 from an operator of the computing device 200, for example.

Figure 4:
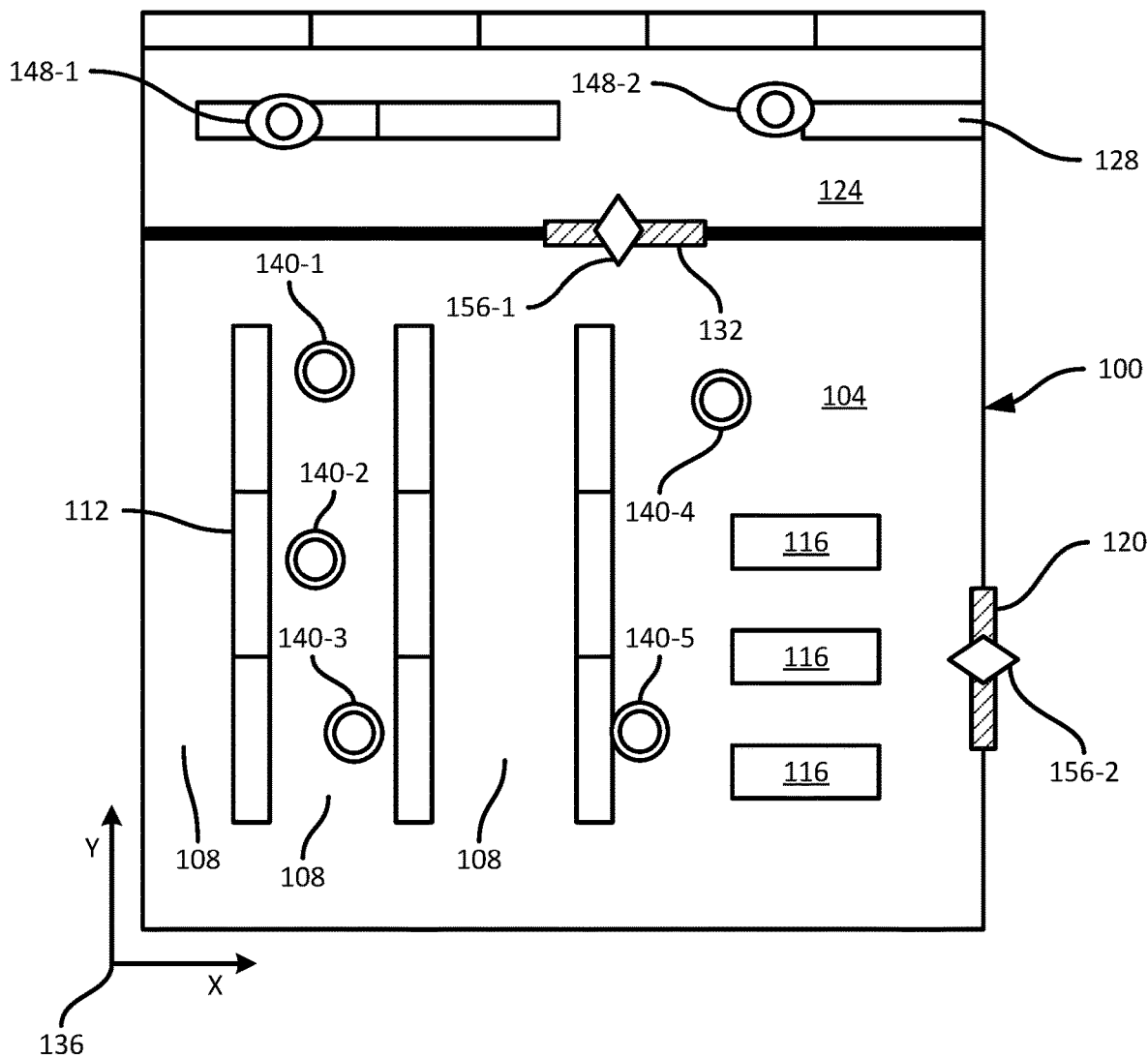
FIG. 4 is a diagram of sensor layout data received at block 320 of the method of FIG. 3.

FIG. 4 illustrates example secondary layout data received at block 320. The secondary layout data specifies, for each of a set of sensors, sensor types and locations, as noted earlier. In the illustrated example, the secondary layout data defines locations for five ceiling-mounted sensors 140 (labelled as 140-1, 140-2, 140-3, 140-4, and 140-5) disposed in the customer area 104. The secondary layout data also defines locations for two sensors 148 (148-1 and 148-2) in the storage room 124, as well as respective transitional sensors 156-1 and 156-2 associated with the doorways 132 and 120.

Returning to FIG. 3, after receiving the secondary layout data—or more generally, any combination of primary and secondary layout data, which together define layout data for a deployment—a location tracking system can be deployed at the facility 100 according to the layout data. That is, sensors are installed within the facility 100 according to the layout data obtained via blocks 310-320. Installation may include a validation process performed on-site at the facility 100, e.g. to confirm that the sensors are correctly installed at the locations specified in the layout data.

At block 325, the computing device 200 is configured to receive performance metrics for the sensors deployed according to the layout data obtained through blocks 310-320. As will be apparent, following installation of the sensors within the facility 100, operation of the sensors (e.g. in conjunction with a controller configured to derive tag locations from tag data read by the sensors) leads to a plurality of tag reads collected by the sensors. In particular, each tag read generated by a given sensor includes a tag identifier (e.g. stored by the tag itself and returned to the sensor in response to a scan signal emitted by the sensor), a timestamp, and a proximity indicator such as a signal strength measurement (e.g. received signal strength indicator, or RSSI) corresponding to a distance between the sensor and the tag. Further, an angular position of each tag relative to the sensor may also be used to derive tag locations. In addition to the tag data, tag locations can be generated from tag reads for the same tag, at substantially the same time, from multiple sensors. The controller mentioned above, for example, can triangulate the location of a given tag in the coordinate system 136, according to two or more substantially simultaneous tag reads containing the same tag identifier.

The computing device 200 is configured to receive both the individual tag reads mentioned above, and the tag locations at block 325. The computing device is further configured to generate performance metrics for the sensors based on the tag reads and/or locations. For example, the computing device 200 can be configured to generate a performance score for each sensor, enabling subsequent evaluation and comparison of the performance of each sensor, which can be employed to determine whether adjustments to the locations and/or orientations of any sensors can be made to improve the performance of the location tracking system.

Figure 5:
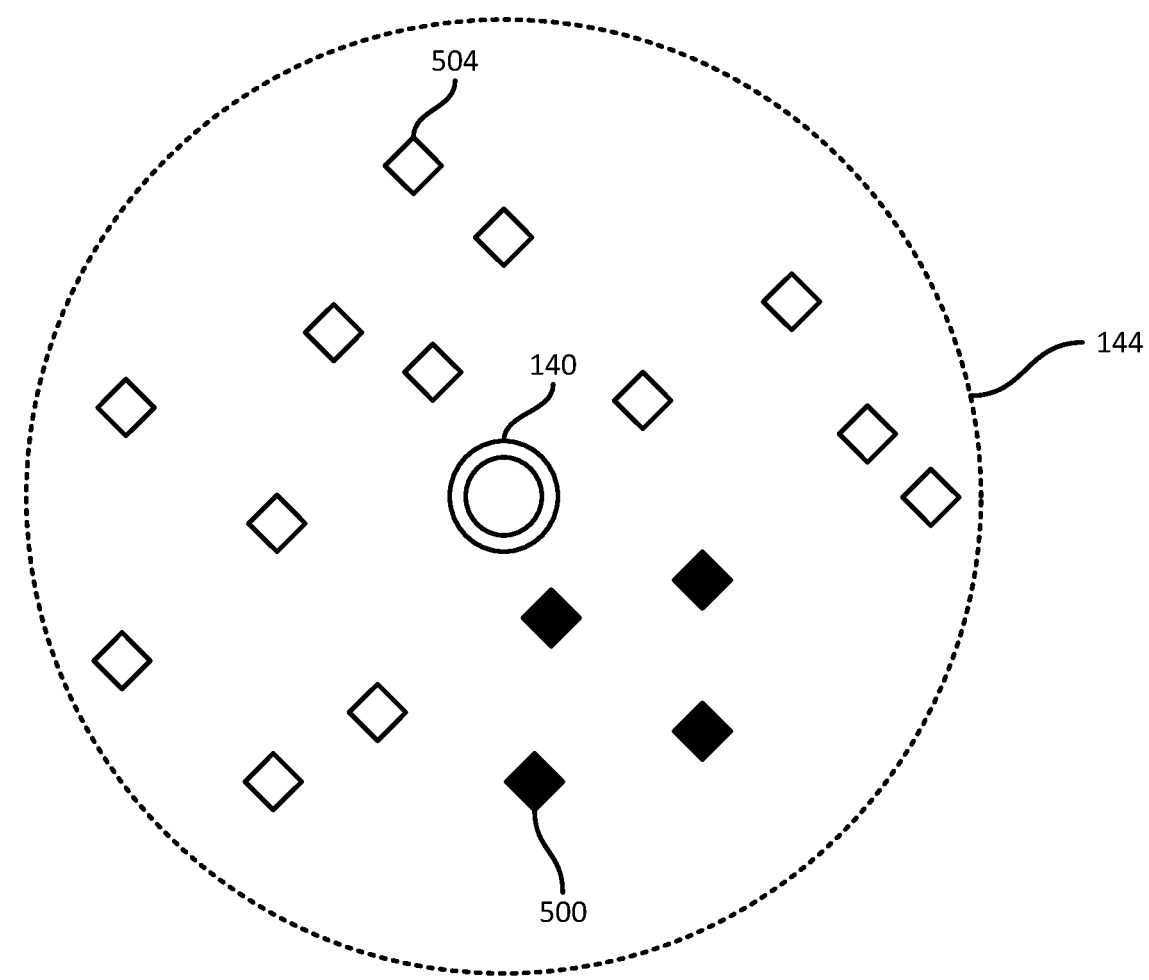
FIG. 5 illustrates a determination of performance data for a location sensor.

The computing device 200 can implement various mechanisms for generating a score for a sensor. For example, the computing device 200 can generate a set of score components reflecting certain aspects of the performance of that sensor, and combine the score components into an overall score. FIG. 5 illustrates the determination of a first example of a score component, in the form of a missed read rate. In particular, the computing device 200 can select a set of unique tags with locations detected within the coverage area 144 of the sensor 140 during a given time period. As will be apparent, the tag locations are determined using tag reads from more than one sensor. Given that the locations are within the coverage area 144, it is expected that tag reads from the sensor 140 contributed to the determination of the selected tag locations. The computing device 200 can therefore determine a number of tag locations that were determined without tag reads from the sensor 140. Such tag locations represent tags that the sensor 140 failed to detect, i.e. missed reads 500 (represented as black diamonds in FIG. 5). Missed reads 500 are distinguished from the remaining tag locations 504, to which the sensor 140 did contribute tag reads. The computing device 200 can determine a ratio of missed reads 500 to total tag locations (e.g. four to seventeen, in the illustrated example, or about 23%). A score component can therefore correspond to the missed read rate, or the complementary successful read rate (e.g. about 77% in the illustrated example).

A high missed read rate score component for a sensor may, for example, be caused by the sensor's close proximity to a physical obstruction. This obstruction, such as a pole, may be inhibiting the sensor's ability to successfully scan for RFID tags. The resulting high missed read rate score component provides an indication that the location sensor may need to be moved away from the obstruction in order to perform better. The high missed read rate may be correlated to the sensor's location relative to the nearby obstruction. This correlation is then used to re-train the model(s) implemented by the application 224 so that subsequent primary layout data generated by the application will be less likely to include such sensor placements relative to this type of obstruction, thereby reducing the opportunity for creating layouts that result in poor system performance.

Figure 6:
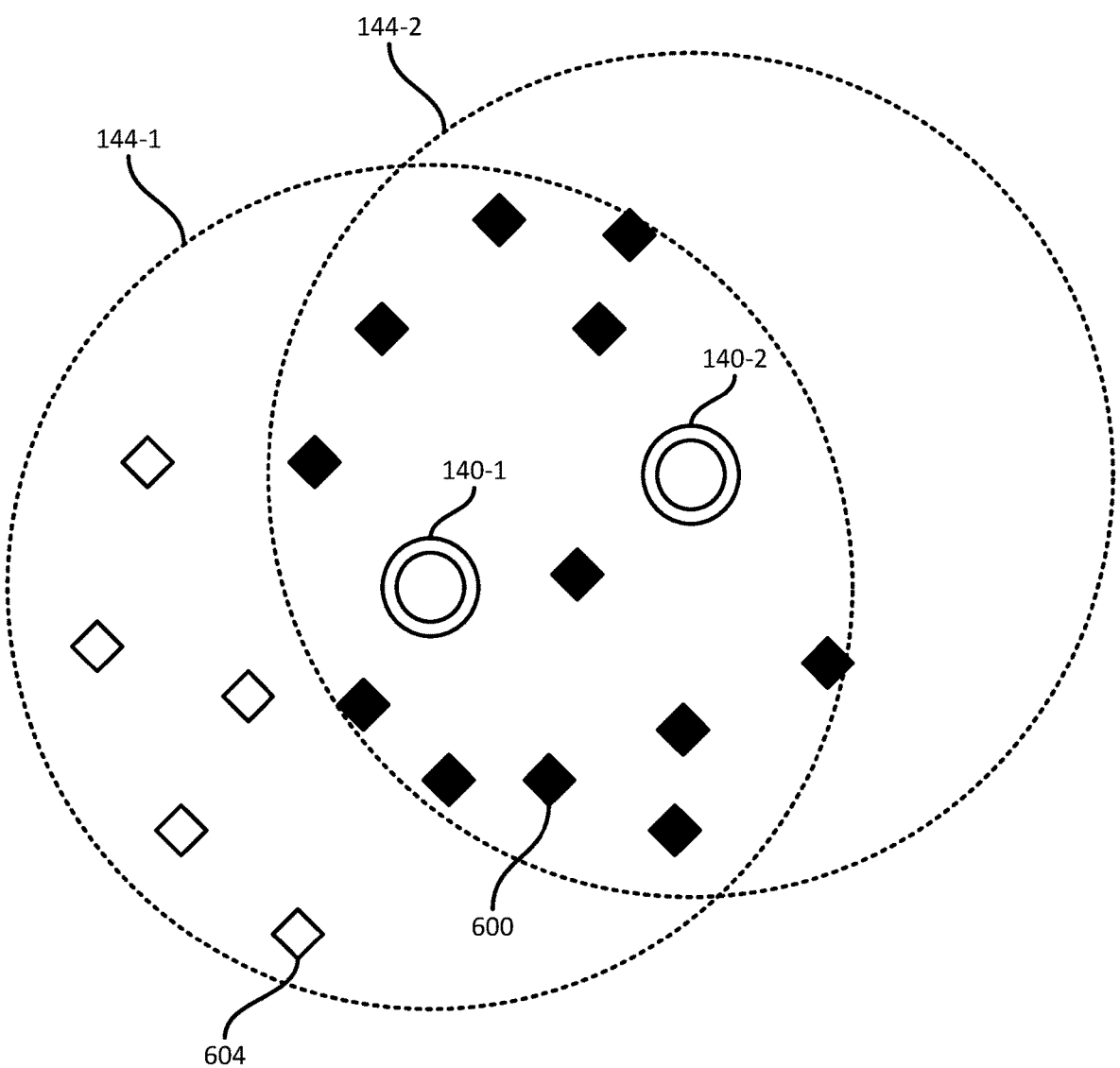
FIG. 6 illustrates a determination of further performance data for a location sensor.

FIG. 6 illustrates a further example score component determination, in the form of an overlap ratio. For example, for a given sensor (e.g. the sensor 140-1 as illustrated in FIG. 6), the computing device can identify a ratio of tag locations to which both the sensor 140-1 itself and an adjacent sensor 140-2 contributed tag reads, relative to all tag locations in the coverage area 144-1 of the sensor 140-1. In the illustrated example, the overlapping tag reads 600 represent twelve of a total of seventeen tag locations (including five tag locations 604 to which the sensor 140-2 did not contribute), or about 70%. The above ratio, or its complement, may be employed as a score component. As will be apparent, a certain degree of overlap between the coverage areas 144-1 and 144-2 may be desirable, at least for certain sensors. However, too little overlap may indicate that the sensors are placed too far apart, resulting in "dead zones," or areas of poor or no location tracking performance. This may be a scenario where the sensors could be moved closer together in order to achieve more continuous location tracking coverage. Further, excessive overlap may indicate that the sensors are placed too closely together. This may be a scenario where the sensors could be moved farther apart, which may potentially reduce the number of total sensors and thereby better optimize system cost without sacrificing location tracking performance. It should be understood that an optimized score component for overlap ratio, or any score component for that matter, may not necessarily be 0% or 100% for certain sensor types, especially if some overlap is desired. Further, certain sensor types (e.g. PoS sensors which are intended to each focus only on a specific PoS transaction area) may be expected to exhibit little or no overlap with adjacent sensors of the same type.

Various other score components will also occur to those skilled in the art. For example, a traffic score component can be determined by comparing the number of total unique tag reads detected by a sensor over a certain time period, relative to the maximum number of total unique tag reads detected by any of the sensors. Such a ratio indicates how busy the sensor is, relative to the busiest sensor in the system.

The above score components can be combined into a performance score, e.g. normalized to a range of zero to one hundred or any other suitable range. The combination, in some examples, can be achieved by simply first summing the components and then normalizing, and in other examples, normalizing the components and then summing them. In other examples, the score components can also be weighted, e.g. such that the missed read rate has a greater effect on total score than the other components.

Figure 7:
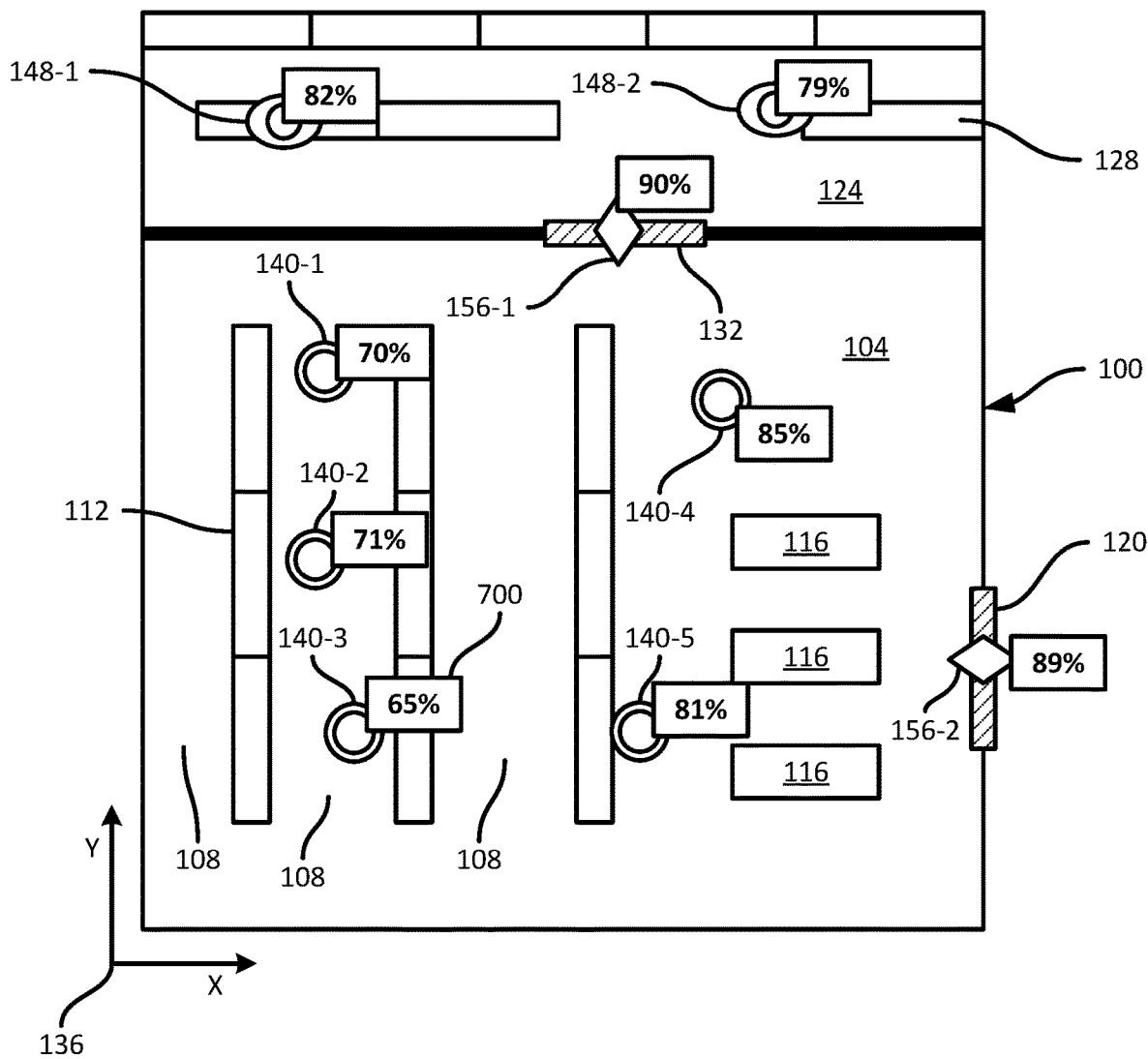
FIG. 7 illustrates performance data presented along with layout data for the facility of FIG. 1.

Having generated the performance metrics, the computing device 200 is configured to present the performance metrics, e.g. via the display 216 along with the map of the facility 100 and the layout data obtained through blocks 310-320. FIG. 7 illustrates an example interface presented at block 325, including performance metrics 700 for each sensor. The performance metrics 700 are presented as percentages, but can be presented in various other formats (including non-numerical formats such as color-coded indicators and the like) and/or other numeric ranges. The presentation of performance metrics at block 325 can enable installation and/or validation staff at the facility 100 to identify sensors with insufficient performance, and adjust the layout of some or all of the sensors in the system, in order to improve system performance.

At block 330, the computing device 200 is configured to update the layout generator 224. That is, the map features mentioned above, as well as the sensor definitions of the layout data, and the performance metrics, are provided as training data to the application 224. Re-training the model(s) implemented by the application 224 therefore establishes correlations between facility features (which generally cannot be altered), sensor types and placements (which can be altered), and sensor performance. When sufficient training data has been collected, the application 224 can be employed to generate sensor definitions that, for a given set of facility features, are likely to produce desirable sensor performance.

Following the training process at block 330, the computing device may receive further secondary layout data at block 320. That is, following the presentation of the performance metrics at block 325, staff at the facility 100 may determine that one or more sensors are to be relocated, added, removed, and/or changed type to improve system performance. The staff therefore provides the computing device 200 with updated sensor definitions, e.g. via the interface shown in FIG. 7. Corresponding changes are also made to the physical installation, following which further performance data can be received at block 325. The corresponding performance metrics for each relevant sensor associated with each physical change may be updated via the interface in FIG. 7. The example sensor definitions illustrated in FIG. 7 may therefore be representative of an interim (i.e. not necessarily the final and/or optimized) sensor layout, as subsequent changes may be made to improve the performance data. As will now be apparent, the above process can be repeated to optimize system performance, with performance data and corresponding layout data being provided to the application 224 as further training data for each set of changes to the system's layout. Thus, over time the application 224 is provided with greater volumes of training data indicative of correlations between facility features, sensor placement, and sensor performance.

Figure 8:
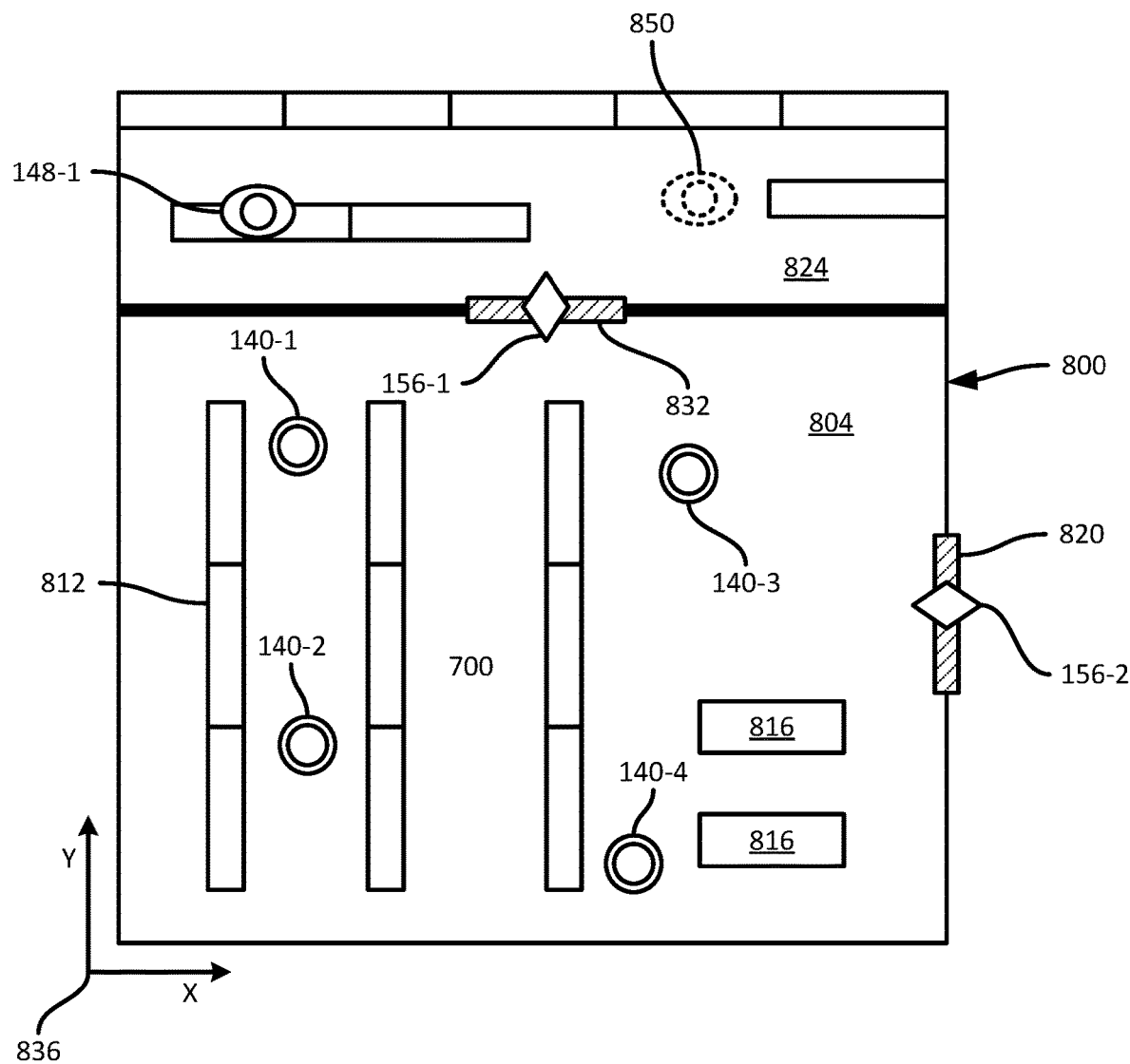
FIG. 8 is a diagram of sensor layout data received at block 310 of the method of FIG. 3.

The performance of the method 300 may also be repeated, e.g. for a further facility. FIG. 8 illustrates a facility 800 that, while not identical to the facility 100, is similarly sized and shaped, and shares certain structural features with the facility 100, such as a common division between a customer area 804 and a storage room 824, a set of three aisles defined by support structures 812 which are physically similar to support structures 112, PoS stations 816 with similar relative locations in the facility 800 as the PoS stations 116, and doorways 820 and 832 in similar locations on the boundary of customer area 804 as the doorways 120 and 132 in the facility 100. As will be apparent, the exact optimized and final sensor layout used in the facility 100 may not be directly applicable to the facility 800. However, certain correlations between sensor placement, facility features, and sensor performance arising from the training data gathered from the facility 100 may nevertheless be employed to at least partially populate a sensor layout for the facility 800. In further embodiments, the type of RFID-tagged items being tracked and/or the density of RFID tags may be considered in the correlations.

In a further performance of the method 300, therefore, the map of the facility 800 can be received at block 305, and at block 310 primary layout data can be generated by the application 224 based on features extracted from the map of the facility 800. FIG. 8 also illustrates primary layout data generated automatically at block 310, including a set of sensor definitions for sensors 140-1 through 140-4, a sensor 148-1, and transitional sensors 156-1 and 156-2. The application 224 may, for example, be configured to generate a confidence level with each sensor definition, indicating the likelihood of that sensor definition resulting in sensor performance that is above a configurable threshold (e.g. 80%). Sensor definitions produced by the application 224 with confidence levels below a threshold may be omitted from the primary layout data. For example, the application 224 may have generated a sensor definition 850 for a further storage room sensor, but omitted the definition 850 from the primary sensor data as a result of an insufficient confidence level. Further, confidence levels may also be assigned to sensors defined by secondary layout data. These confidence levels indicate to the map maker what kind of performance to expect from those sensors and as such, whether the sensors are defined in a way suitable for optimizing system performance. Thresholds can be set for such sensors as well and be used to alert the map maker that adjustments may be needed in order to achieve optimum performance. In some cases, the application 224 may make recommendations for those adjustments, based on the training data provided to the application. In some embodiments, multiple thresholds may be configured based on different alert levels, such as a high alert, medium advisory, low reference, and the like, with different recommendations presented as each threshold is passed.

As will now be apparent, at blocks 315 and 320, the presentation of primary layout data and receipt of secondary layout data enable the generation of a complete layout with reduced manual input from a map maker or other expert. Such map makers or other experts can now therefore focus their time on auditing the output of the layout generator 224 rather than spending a considerably more amount of time on creating complete layouts themselves. In some cases, the primary layout data automatically generated by the application 224 is sufficient, and therefore no secondary layout data needs to be manually entered by the map maker or expert. In other cases, the map maker may select areas of the map to utilize the layout generator to create the primary layout data, leaving specific areas, such as those with unique features, to address with manually entered secondary layout data. In some examples, such as that in FIG. 8, a map maker may add a further sensor 148 to the storage room 824, and may otherwise leave the primary sensor layout data untouched. In other examples, the map maker may alter sensor positions from the primary sensor data, add or remove sensors, and the like. Such tasks may, however, consume a smaller amount of time than the creation of layout data from scratch by the map maker. Further, the deployment and performance assessment for a location tracking system in the facility 800 results in the collection of further data in the repository 232 for training the application 224, which in turn may lead to generation of still more complete primary layout data for other facilities.

As will be apparent, therefore, as the volume of performance data for existing layouts in the repository 232 grows, the accuracy of the automatically generated primary layout data at block 310 may improve, reducing the reliance on map makers or other expert staff in generating layout data. With a higher confidence level that layouts will now be more optimized when they are initially generated early in the deployment process, relatively fewer, or in some cases, no adjustments to the physical sensor layouts may be needed later, after installation. Correspondingly, fewer or no adjustments may be needed to the associated layout as well. This makes the deployment of the location tracking system more efficient.

Variations to the above methods and systems are contemplated. For example, a plurality of distinct primary layout generator applications can be implemented, rather than the single application 224 shown in FIG. 2. For example, separate models can be implemented for facilities in various size ranges, facilities of various types, and the like. Therefore, at block 310 the computing device 200 can also be configured to select a specific layout generator, e.g. based on certain facility features (e.g. area, facility type, or the like).

In further examples, distinct performance metrics can be computed for the sensors for each of static tags and dynamic (i.e. moving) tags. The performance data collected from a system may include a tag status for each tag, indicating whether the tag is in motion or static. This status may be determined for each tag at least in part, for example, by the frequency at which the tag is read on the same sensor (e.g. a tag read repeatedly by the same sensor may indicate the tag is stationary during the time interval of those reads, while a tag read by numerous sensors spatially spread across the facility may indicate the tag is in motion). Thus, the computing device 200 can generate separate performance metrics for static and dynamic tags, enabling the performance of location tracking systems to be tuned to emphasize performance for tags in motion or tags at rest.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method in a computing device, the method comprising:
   receiving a map defining a set of features of a facility;
   obtaining layout data corresponding to the facility, the layout data defining, for each of a plurality of location tracking sensors, a location in a facility coordinate system;
   in response to deployment of the location tracking sensors in the facility according to the layout data, obtaining a performance metric for each of the location tracking sensors; and
   updating a primary layout generator according to the map, the layout data, and the performance metrics,
   wherein updating the primary layout generator includes executing a training mechanism based on the features, the layout data, and the performance metrics.

2. The method of claim 1, wherein the features of the facility include one or more of:
   walls, support structures, doorways, or point of sale terminals.

3. The method of claim 1, wherein the layout data includes, for each location tracking sensor, a sensor type.

4. The method of claim 1, wherein obtaining the performance metric includes, for each location tracking sensor:
   collecting tag data corresponding to a plurality of electronic tags located in the facility; and
   determining the performance metric based on the tag data.

5. The method of claim 4, wherein determining the performance metric includes:
   determining locations for each electronic tag; and
   at least one of: (i) determining a missed proportion of the electronic tags within a sensing region of the location tracking sensor that were not detected by the location tracking sensor; (ii) determining an overlap proportion of electronic tags within the sensing region also detected by an adjacent location tracking sensor.

6. The method of claim 5, wherein determining the performance metric includes generating a score based on the missed proportion and the overlap proportion.

7. The method of claim 1, further comprising:
   in response to obtaining the performance metric for each of the location tracking sensors, presenting the performance metrics;
   receiving updated layout data reflecting physical adjustments to at least some of the location tracking sensors;
   obtaining updated performance metrics for the location tracking sensors; and
   repeating updating the primary layout generator, according to the map, the updated layout data, and the updated performance metrics.

8. The method of claim 1, further comprising:
receiving a second map defining a second set of features of a second facility;
using the primary layout generator, generating at least a portion of second layout data defining locations for a second plurality of location tracking sensors, in a second facility coordinate system.

9. The method of claim 8, further comprising:
presenting the portion of the second layout data; and
receiving a further portion of the second layout data via an input device.

10. A computing device, comprising:
a communications interface;
a memory; and
a processor configured to:
  receive a map defining a set of features of a facility;
  obtain layout data corresponding to the facility, the layout data defining, for each of a plurality of location tracking sensors, a location in a facility coordinate system;
  in response to deployment of the location tracking sensors in the facility according to the layout data, obtain a performance metric for each of the location tracking sensors; and
  update a primary layout generator according to the map, the layout data, and the performance metrics,
  wherein the processor is configured, to update the primary layout generator, to execute a training mechanism based on the features, the layout data, and the performance metrics.

11. The computing device of claim 10, wherein the features of the facility include one or more of: walls, support structures, doorways, or point of sale terminals.

12. The computing device of claim 10, wherein the layout data includes, for each location tracking sensor, a sensor type.

13. The computing device of claim 10, wherein the processor is configured, to obtain the performance metric, to:
for each location tracking sensor:
  collect tag data corresponding to a plurality of electronic tags located in the facility; and
  determine the performance metric based on the tag data.

14. The computing device of claim 13, wherein the processor is configured, to determine the performance metric, to:
determine locations for each electronic tag; and
at least one of: (i) determine a missed proportion of the electronic tags within a sensing region of the location tracking sensor that were not detected by the location tracking sensor; (ii) determine an overlap proportion of electronic tags within the sensing region also detected by an adjacent location tracking sensor.

15. The computing device of claim 14, wherein the processor is configured, to determine the performance metric, to generate a score based on the missed proportion and the overlap proportion.

16. The computing device of claim 10, wherein the processor is further configured to:
in response to obtaining the performance metric for each of the location tracking sensors, present the performance metrics;
receive updated layout data reflecting physical adjustments to at least some of the location tracking sensors;
obtain updated performance metrics for the location tracking sensors; and
repeat updating the primary layout generator, according to the map, the updated layout data, and the updated performance metrics.

17. The computing device of claim 10, wherein the processor is further configured to:
receive a second map defining a second set of features of a second facility;
using the primary layout generator, generate at least a portion of second layout data defining locations for a second plurality of location tracking sensors, in a second facility coordinate system.

18. The computing device of claim 17, wherein the processor is further configured to:
present the portion of the second layout data; and
receive a further portion of the second layout data via an input device.

* * * * *